(12) United States Patent
Zou et al.

(10) Patent No.: US 10,838,361 B2
(45) Date of Patent: Nov. 17, 2020

(54) HOLOGRAPHIC GRATING LITHOGRAPHY SYSTEM AND A METHOD FOR ADJUSTING THE SELF-COLLIMATION OF THE INTERFERENCE OPTICAL PATH THEREOF

(71) Applicant: SOOCHOW UNIVERSITY, Suzhou (CN)

(72) Inventors: Wenlong Zou, Suzhou (CN); Chaoming Li, Suzhou (CN); Jianhong Wu, Suzhou (CN); Xinrong Chen, Suzhou (CN); Zhijian Cai, Suzhou (CN); Quan Liu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 64 days.

(21) Appl. No.: 16/430,606

(22) Filed: Jun. 4, 2019

(65) Prior Publication Data

US 2019/0361394 A1 Nov. 28, 2019

Related U.S. Application Data

(63) Continuation-in-part of application No. PCT/CN2018/087827, filed on May 22, 2018.

(51) Int. Cl.
*G03H 1/04* (2006.01)

(52) U.S. Cl.
CPC ... *G03H 1/0402* (2013.01); *G03H 2001/0439* (2013.01); *G03H 2222/12* (2013.01); *G03H 2223/23* (2013.01); *G03H 2223/24* (2013.01); *G03H 2223/52* (2013.01)

(58) Field of Classification Search
CPC .................... G02B 6/02076; G02B 6/0208
See application file for complete search history.

(56) References Cited

U.S. PATENT DOCUMENTS 5,999,672 A * 12/1999 Hunter ............... G02B 6/29307
385/24
2010/0225913 A1 * 9/2010 Trainer .............. G01N 15/0205
356/338

FOREIGN PATENT DOCUMENTS

| CN | 85104065 A | 7/1986 |
| CN | 1737612 A | 2/2006 |
| CN | 1845016 A | 10/2006 |
| CN | 102087480 A | 6/2011 |
| CN | 102636968 A | 8/2012 |

(Continued)

*Primary Examiner* — Jennifer D. Carruth
(74) *Attorney, Agent, or Firm* — SZDC Law P.C.

(57) ABSTRACT

A Volume Bragg grating (VBG) is placed in the back of a collimating lens, the incident angle between exposure light beam and the Volume Bragg grating is equal to the Bragg angle of the Volume Bragg grating. A photodetector is placed in the −1 grade transmission diffraction light path of the Volume Bragg grating which the exposure light beam is emitted to. The pinhole filter is moved back and forth along an optical axis and the reading of the photodetector is observed in real time. When the reading of the photodetector is maximum, fix the pinhole filter and keep the distance between the first pinhole filter and the first collimating lens a constant. The method for adjusting the self-collimation optical path is provided, using the Volume Bragg grating to detect the parallelism of self-collimation light and substituting for a traditional Moire pattern adjustment method.

8 Claims, 2 Drawing Sheets

(56) References Cited

FOREIGN PATENT DOCUMENTS

| CN | 106226855 A | 12/2016 |
|---|---|---|
| WO | 2007096932 A2 | 8/2007 |

* cited by examiner

HOLOGRAPHIC GRATING LITHOGRAPHY SYSTEM AND A METHOD FOR ADJUSTING THE SELF-COLLIMATION OF THE INTERFERENCE OPTICAL PATH THEREOF

This application is a continuation-in-part application of PCT/CN2018/087827, filed on May 22, 2018.

BACKGROUND OF THE INVENTION

1. Technical Field

The technical field relates to information optics, and more particularly relates to a holographic grating lithography system and a method for adjusting the self-collimation of the interference optical path thereof.

2. Description of Related Art

A plane parallel equidistant striped holographic grating is an important diffraction optical element, widely used in spectrometer, Optical communication, optical metrology, strong laser system etc. That grating has harsh requirement of parallelism of the grating fringe, the low level parallelism of the recording light directly influences the wave aberration of the grating. Therefore, the self-collimation of the parallel light of the holographic grating should be good. Aspheric lens or off-axis parabolic mirror is often used as the Collimator to collimate the light to the parallel light. The most common ways of Collimation Detection of Holographic light path are Moire Fringe method and standard reference grating method.

Moire fringe method: As shown in FIG. 2, the parallel light is reflected back to the pinhole filter by using self-collimation method firstly. According to the previous experience, the diameter of the reflected light spot is around 5mm, the pinhole filter is in the front focal plane of the lens, and the parallel light is generated. The holographic grating is fabricated by using the traditional way to exposure and develop, and the fabricated grating substrate is rotated 180 degree, placed in original optical path. Adjusting the Moire fringe period to centimeter level and observe the Moire fringe. If the Moire fringe is bended in bowl shape, it means the pinhole is defocus, and Adjusting the position of the pinhole until the Moire fringe is horizontality. Recording the horizontal displacement of the adjustment, adjusting the position of the pinhole to the half of the displacement recorded of the adjustment, and the pin hole is in the front focal plane of the collimation lens. A testing grating need to be fabricated by using this method and it is easily effected by the environment and ineffective.

Standard reference grating method: The standard grating is positioned on the exposure support, as shown in FIG. 2, the parallel light is reflected back to the pinhole filter by using self-collimation method firstly. According to the previous experience, the diameter of the reflected light spot is around 5mm, the pinhole filter is in the front focus position of the lens, and the parallel light is generated. Observing the Moire fringe of the reference grating and adjusting the Moire fringe period to centimeter level. If the Moire fringe is bended in bowl shape, it means the pinhole is defocus, and Adjusting the position of the pinhole until the Moire fringe is horizontality and it means the pinhole is in the front focal plane of the collimation lens, The reference grating need to be fabricated by using this method, and it is complex to fabricate a reference grating and repeat inspection is needed by using interferometer until a standard reference grating with low aberrations is fabricated.

SUMMARY OF THE INVENTION

The object of the disclosure is to solve the problem of poor parallelism of the exposure light as fabricating the parallel equidistant stripe holographic grating, this disclosure is described below.

A holographic grating lithography system of manufacturing parallel equidistant striped holographic grating, comprising: a coherent light source, a beam splitter, a first reflecting mirror, a second reflecting mirror, a first pinhole filter, a second pinhole filter, a first collimation lens, a second collimation lens, a first Volume Bragg grating, a second Volume Bragg grating, a first photodetector, a second photodetector; wherein, a light beam is emitted by the coherent source is split into a transmitted light beam and a reflected light beam after passing through the beam splitter, the first reflecting mirror, the first pinhole filter and the first collimation lens are sequentially placed along the light propagation direction of the reflected light beam, the second reflecting mirror, the second pinhole filter and the second collimation lens are sequentially placed in light path of the transmitted light beam; the reflected light beam is a first exposure light beam after passing through the first collimation lens, the transmitted light beam is a second exposure light beam after passing through the second collimation lens, the first pinhole filter is placed in the position of the object focus of the first collimation lens; the second pinhole filter is placed in the position of the object focus of the second collimation lens, wherein, being close to the coherent light source, the position is defined as the front; the position of the light propagation direction is defined as the back, the first Volume Bragg grating is placed in the back of the first collimation lens and the diameter of the first Volume Bragg grating is smaller than the diameter of the first collimation lens, the incidence angle between the first exposure light beam and the first Volume Bragg grating is equal to the Bragg angle of the first Volume Bragg grating, the first photodetector is placed in the back of the −1 grade of transmission diffraction light path of the first Volume Bragg grating where the first exposure light beam being incident, used to measure the diffraction efficiency of −1 grade transmission diffraction light; the second Volume Bragg grating is placed in the back of the second collimation lens and the diameter of the first Volume Bragg grating is smaller than the diameter of the second collimation lens, the incidence angle between the second exposure light beam and the second Volume Bragg grating is equal to the Bragg angle of the second Volume Bragg grating, the second photodetector is placed in the back of the −1 grade of transmission diffraction light path of the second Volume Bragg grating where the second exposure light beam being incident, used to measure the diffraction efficiency of −1 grade transmission diffraction light.

In order to control the period of the holographic grating lithography system, the preferred embodiment is that the first exposure light beam and the second exposure light beam are symmetry arranged corresponding to the normal line of the holographic recording plate to be fabricated, satisfied with the equation $2d \sin \theta = \lambda$, wherein d is the period of the holographic recording plate to be fabricated, $\lambda$, is the wavelength of the coherent source, $\theta$ is the half of an angle between the first exposure light beam and the second exposure light beam.

In order to filter the Stray light in the light path to obtain more clear interference fringe, the preferred embodiment is that a first diaphragm is further placed between the first reflecting mirror and the first pinhole filter, a second diaphragm is further placed between the second reflecting mirror and the second pinhole filter.

The said collimation lens are plano-convex aspherical collimation lens to correct aspherical aberration to obtain high quality parallel light.

The first pinhole filter is mounted on a first PZT translation stage, the second pinhole filter is mounted on a second PZT translation stage. The reading of the first photodetector is fed back to the corresponding first PZT translation stage in real time, when the reading of the first photodetector change, the first PZT translation stage drives the first pinhole filter to move along optical axis direction to the position with the maximum reading of the first photodetector.

The reading of the second photodetector is fed back to the corresponding second PZT translation stage in real time, when the reading of the second photodetector change, the second PZT translation stage drives the second pinhole filter to move along optical axis direction to the position with the maximum reading of the first photodetector.

The said maximum reading of the photodetector as mention above is the maximum diffraction efficiency of the −1 grade transmission diffraction light of the Volume Bragg grating detected by the photodetector as the pin hole filter move back and forth along the optical axis.

The theory of the method, as mentioned above, for adjusting the self-collimation of an interference optical path is that the included angle between the first exposure light beam and the external normal of the Volume Bragg grating satisfied with the equation $2d_0\theta_b \sin=\lambda c$, wherein $d_0$ is the period of the holographic grating, $\theta_b$ is the included angle between the incident light and the external normal of the Volume Bragg grating (the Bragg angle of the Volume Bragg grating), $\lambda_C$ is the wavelength of the coherent source, the diffraction efficiency of the −1 grade transmission diffraction light is maximum.

If the angle of the incident light shift the Bragg angle a bit, the −1 grade diffraction efficiency of the Volume Bragg grating drops rapidly. When the shift angle is out of certain range (±0.01°), the −1 grade diffraction efficiency reduces to the half of the peak. When the light beam is parallel, the −1 grade diffraction efficiency reach the peak and the reading of the first photodetector is maximum. When the first exposure light is divergent light or converging light, most incident light shift the Bragg angle of the Volume Bragg grating and the −1 grade diffraction efficiency of the Volume Bragg grating drops rapidly. The specific adjustment method is that move the first pinhole filter back and forth along optical axis and observe the reading of photodetector in real time. When the reading of the photodetector is maximum, stop moving the pinhole filter and the first pinhole filter is accurately placed in the position of object focus of the first collimation lens at the time, the first exposure light is collimated to parallel light. By using the same method to collimate the second exposure light, thus, the adjustment of the self-collimation of the light is finished. After adjusting, remove the Volume Bragg grating and the photodetector, and the parallel equidistant interference stripe is generated with the interference between the first exposure light and the second exposure light, then, a parallel equidistant stripe holographic grating is obtained by using the parallel equidistant interference stripe to exposes the holographic recording plate to be fabricated and process the lithography process.

According to the method mentioned above for adjusting the self-collimation of an interference optical path in a holographic grating lithography system, Move the first pinhole filter back and forth along optical axis and observe the reading of photodetector in real time. When the reading of the photodetector is maximum, fix the first pinhole filter and keep the distance between the first pinhole filter and the first collimation lens a constant. Move the second pinhole filter back and forth along optical axis and observe the reading of photodetector in real time. When the reading of the photodetector is maximum, fix the second pinhole filter and keep the distance between the second pinhole filter and the first collimation lens a constant.

In a preferred embodiment, the first pinhole filter is mounted on a first PZT translation stage, the second pinhole filter is mounted on a second PZT translation stage. The reading of the first photodetector is fed back to the corresponding first PZT translation stage in real time, when the reading of the first photodetector change, the first PZT translation stage drives the first pinhole filter to move along optical axis direction to the position with the maximum reading of the first photodetector. The reading of the second photodetector is fed back to the corresponding second PZT translation stage in real time, when the reading of the second photodetector change, the second PZT translation stage drives the second pinhole filter to move along optical axis direction to the position with the maximum reading of the first photodetector.

DETAILED DESCRIPTION OF THE INVENTION

Embodiments of the invention will now be described, by way of example only, with reference to the accompanying drawings.

EXAMPLE 1

Figure 1:
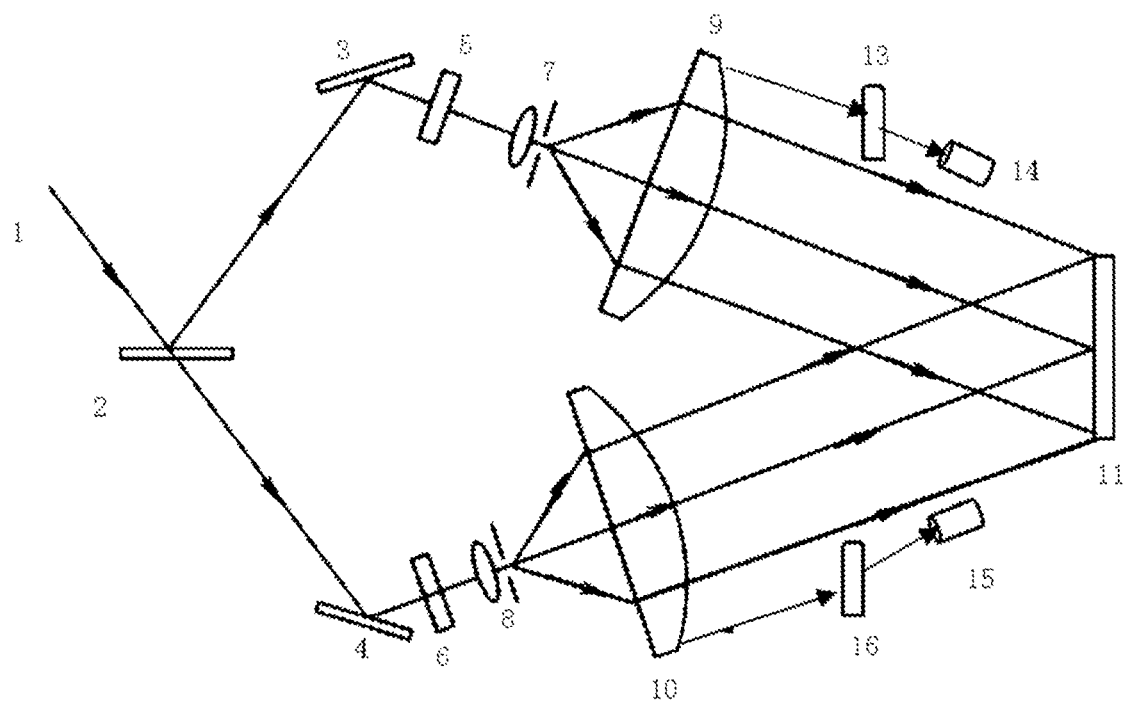
FIG. 1 illustrates schematic diagram of manufacturing lithography system of the parallel equidistant striped holographic grating.

A lithography system of the holographic grating is shown in FIG. 1. The said lithography system of the holographic grating is used to fabricate the parallel equidistant striped holographic grating comprising a coherent sources 1, a beam splitter 2, a first reflecting mirror 3, a second reflecting mirror 4, a first pinhole filter 7, a second pinhole filter 8, a first collimation lens 9, a second collimation lens 10, a first Volume Bragg grating 13, a first photodetector 14, a second photodetector 15.

A light beam is emitted by the coherent source is split into a transmitted light beam and a reflected light beam after passing through the beam splitter, the first reflecting mirror, the first pinhole filter and the first collimation lens are sequentially placed along the light propagation direction of the reflected light beam, the second reflecting mirror, the second pinhole filter and the second collimation lens are sequentially placed in light path of the transmitted light beam. The reflected light beam is a first exposure light beam after passing through the first collimation lens, the transmitted light beam is a second exposure light beam after passing through the second collimation lens, the first pinhole filter is placed in the position of the object focus of the first collimation lens, the second pinhole filter is placed in the position of the object focus of the second collimation lens.

The position near the coherent light source is defined as the front, the position of the light propagation direction is defined as the back, the first Volume Bragg grating is placed in the back of the first collimation lens and the diameter of the first Volume Bragg grating is smaller than the diameter of the first collimation lens, the incidence angle between the first exposure light beam and the first Volume Bragg grating is equal to the Bragg angle of the first Volume Bragg grating, the first photodetector is placed in the back of the −1 grade of transmission diffraction light path of the first Volume Bragg grating where the first exposure light beam being incident, used to measure the diffraction efficiency of −1 grade transmission diffraction light.

The second Volume Bragg grating is placed in the back of the second collimation lens and the diameter of the first Volume Bragg grating is smaller than the diameter of the second collimation lens, the incidence angle between the second exposure light beam and the second Volume Bragg grating is equal to the Bragg angle of the second Volume Bragg grating, the second photodetector is placed in the back of the −1 grade of transmission diffraction light path of the second Volume Bragg grating where the second exposure light beam being incident, used to measure the diffraction efficiency of −1 grade transmission diffraction light.

Figure 2:
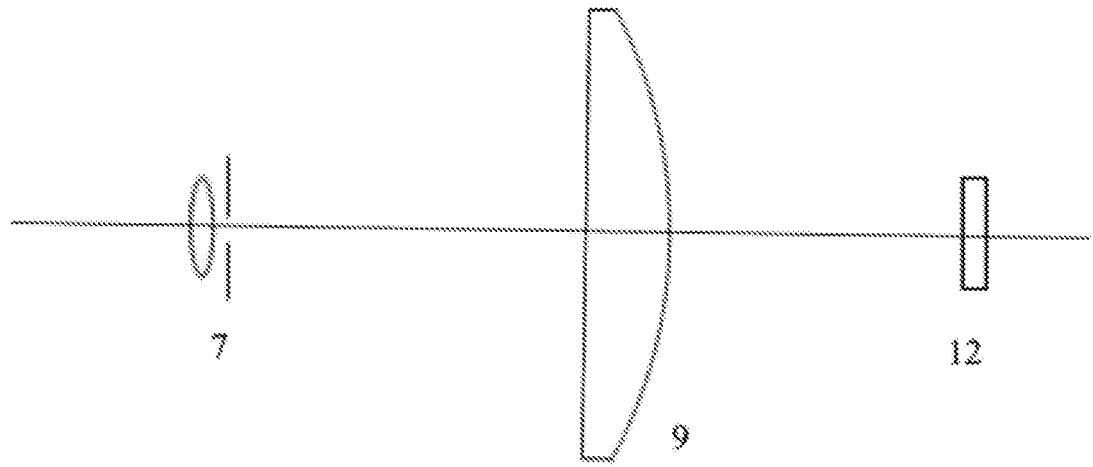
FIG. 2 illustrates schematic diagram of coarse adjustment of the self-collimation light.

A step of the self-collimation is described below. The coarse adjustment of the self-collimation light is that the plane mirror 12 is inserted into the back of the first collimation lens in the direction being vertical to the optical axis as shown in FIG. 2, firstly. Adjusting the position of the first pinhole filter along optical axis to make the first exposure light beam reflected by the plane mirror and pass through the first pinhole filter. The said plane mirror is inserted into the back of the first collimation lens along the direction being vertical to the optical axis. Adjusting the position of the second pinhole filter along optical axis to make the second exposure light beam reflected back by the plane mirror and pass through the second pinhole filter.

Figure 3:
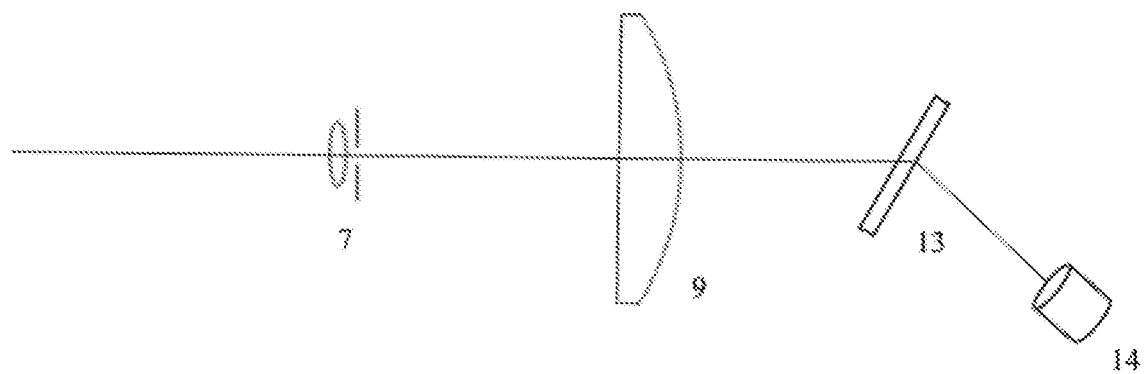
FIG. 3 illustrates schematic diagram of fine adjustment of the self-collimation light.

The fine adjustment of the self-collimation light is that move the first pinhole filter back and forth along optical axis and observe the reading of photodetector in real time as shown in FIG. 3. When the reading of the photodetector is maximum, fix the first pinhole filter and keep the distance between the first pinhole filter and the first collimation lens a constant.

Move the second pinhole filter back and forth along optical axis and observe the reading of photodetector in real time. When the reading of the photodetector is maximum, fix the second pinhole filter and keep the distance between the second pinhole filter and the first collimation lens a constant.

In a preferred embodiment, a first diaphragm 5 is further placed between the first reflecting mirror 3 and the first pinhole filter 7; a second diaphragm 6 is further placed between the second reflecting mirror 4 and the second pinhole filter 8. By using the first diaphragm 5 and the second diaphragm 6 to filter the stray light.

EXAMPLE 2

A lithography system of the holographic grating, in accordance with example 1, the first pinhole filter is mounted on a first PZT translation stage, and the second pinhole filter is mounted on a 2nd PZT translation stage seperately. The reading of the first photodetector is fed back to the corresponding first PZT translation stage in real-time. When the reading of the first photodetector changes, the first PZT translation stage drives the first pinhole filter to move along optical axis direction to the position with the maximum reading of the first photodetector.

The reading of the second photodetector is fed back to the corresponding second PZT translation stage in real-time. When the reading of the second photodetector changes, the second PZT translation stage drives the second pinhole filter to move along optical axis direction to the position with the maximum reading of the first photodetector.

EXAMPLE 3

A method for adjusting the self-collimation of an interference optical path in a holographic grating lithography system, using the said holographic grating lithography system of example 1. Move the first pinhole filter back and forth along optical axis and observe the reading of photodetector in real time. When the reading of the photodetector is maximum, fix the first pinhole filter and keep the distance between the first pinhole filter and the first collimation lens a constant.

Move the second pinhole filter back and forth along optical axis and observe the reading of photodetector in real time. When the reading of the photodetector is maximum, fix the second pinhole filter and keep the distance between the second pinhole filter and the first collimation lens a constant.

The technical effects of the present invention are that more precise determination of the distance between the pinhole filter and the collimation lens is achieved by using −1 grade transmission diffraction efficiency of Volume Bragg grating as the judging standard of parallel light, thus, the pinhole filter is accurately placed on the position of the object focus of the collimation lens to collimate the interference light path. In addition, real-time monitoring of the parallelism of the exposure light beam and locking parallel light with the PZT translation stage are achieved in this method. Therefore, the quality of parallel equidistant striped holographic grating is improved.

It is to be understood that the undetailed part of the invention is the prior art in this field. While the invention has been described in terms of preferred embodiments, those skilled in the art will recognize that the invention can be practiced with modifications within the spirit and scope of the appended claims.

What is claimed is:

1. A holographic grating lithography system of manufacturing parallel equidistant striped holographic grating, comprising: a coherent light source, a beam splitter, a first reflecting mirror, a second reflecting mirror, a first pinhole filter, a second pinhole filter, a first collimation lens, a second collimation lens, a first Volume Bragg grating, a second Volume Bragg grating, a first photodetector, and a second photodetector, wherein a light beam is emitted by the coherent source is split into a transmitted light beam and a reflected light beam after passing through the beam splitter, the first reflecting mirror, the first pinhole filter and the first collimation lens are sequentially placed along the light propagation direction of the reflected light beam, the second reflecting mirror, the second pinhole filter and the second collimation lens are sequentially placed in light path of the transmitted light beam, the reflected light beam is a first exposure light beam after passing through the first collimation lens, the transmitted light beam is a second exposure light beam after passing through the second collimation lens, the first pinhole filter is placed in the position of the object focus of the first collimation lens, the second pinhole filter is placed in the position of the object focus of the second collimation lens, and wherein the position near the coherent light source is defined as the front, the position of the light propagation direction is defined as the back, the first Volume Bragg grating is placed in the back of the first collimation lens and the diameter of the first Volume Bragg grating is smaller than the diameter of the first collimation lens, the incidence angle between the exposure light beam and the first Volume Bragg grating is equal to the Bragg angle of the first Volume Bragg grating, the first photodetector is placed in the back of the −1 grade of transmission diffraction light path of the first Volume Bragg grating where the first exposure light beam being incident, used to measure the diffraction efficiency of −1 grade transmission diffraction light, and wherein the second Volume Bragg grating is placed in the back of the second collimation lens and the diameter of the first Volume Bragg grating is smaller than the diameter of the second collimation lens, the incidence angle between the second exposure light beam and the second Volume Bragg grating is equal to the Bragg angle of the second Volume Bragg grating, the second photodetector is placed in the back of the −1 grade of transmission diffraction light path of the second Volume Bragg grating where the second exposure light beam being incident, used to measure the diffraction efficiency of −1 grade transmission diffraction light.

2. The holographic grating lithography system according to claim 1, wherein, the first collimation lens and the second collimation lens are plano-convex aspherical collimation lens.

3. The holographic grating lithography system according to claim 1, wherein, the first exposure light beam and the second exposure light beam are symmetrically arranged corresponding to the normal line of the holographic recording plate to be fabricated, satisfied with the equation 2d sin θ=λ, wherein d is the period of the holographic recording plate to be fabricated, λ, is the wavelength of the coherent source, θ is the half of an angle between the first exposure light beam and the second exposure light beam.

4. The holographic grating lithography system according to claim 1, wherein, a first diaphragm is further placed between the first reflecting mirror and the first pinhole filter, a second diaphragm is further placed between the second reflecting mirror and the second pinhole filter.

5. A method for adjusting the self-collimation of an interference optical path of the holographic grating lithography system, wherein the said holographic grating lithography system according to claim 4, comprising:

moving the first pinhole filter back and forth along optical axis and observing the reading of photodetector in real time, when the reading of the photodetector is maximum, fixing the first pinhole filter and keeping the distance between the first pinhole filter and the first collimation lens a constant, and wherein moving the second pinhole filter back and forth along optical axis and observing the reading of photodetector in real time, when the reading of the photodetector is maximum, fixing the second pinhole filter and keeping the distance between the second pinhole filter and the first collimation lens a constant.

6. The holographic grating lithography system according to claim 1, wherein, the first pinhole filter is mounted on a first PZT translation stage, the second pinhole filter is mounted on a second PZT translation stage, the reading of the first photodetector is fed back to the corresponding first PZT translation stage in real time, when the reading of the first photodetector change, the first PZT translation stage drives the first pinhole filter to move along optical axis direction to the position with the maximum reading of the first photodetector, and wherein the reading of the second photodetector is fed back to the corresponding second PZT translation stage in real time, when the reading of the second photodetector change, the second PZT translation stage drives the second pinhole filter to move along optical axis direction to the position with the maximum reading of the first photodetector.

7. A method for adjusting the self-collimation of an interference optical path of the holographic grating lithography system, wherein the holographic grating lithography system according to claim 1, comprising:

moving the first pinhole filter back and forth along optical axis and observing the reading of photodetector in real time, when the reading of the photodetector is maximum, fixing the first pinhole filter and keep the distance between the first pinhole filter and the first collimation lens a constant, and wherein moving the second pinhole filter back and forth along optical axis and observing the reading of photodetector in real time, when the reading of the photodetector is maximum, fixing the second pinhole filter and keeping the distance between the second pinhole filter and the first collimation lens a constant.

8. A method for adjusting the self-collimation of an interference optical path of the holographic grating lithography system according to claim 7, wherein, a plane mirror is used as assistant adjustment, and using the Volume Bragg grating to adjust after assistant adjustment, and wherein steps of using the plane reflective mirror as assistant adjustment comprising:

first, the plane mirror is inserted into the back of the first collimation lens in the direction being vertical to the optical axis, adjusting the position of the first pinhole filter along optical axis to make the first exposure light beam reflected by the plane mirror and pass through the first pinhole filter, and wherein the said plane mirror is inserted into the back of the first collimation lens along the direction being vertical to the optical axis, adjusting the position of the second pinhole filter along optical axis to make the second exposure light beam reflected back by the plane mirror and pass through the second pinhole filter.

* * * * *